United States Patent [19]
Furuta et al.

[11] Patent Number: 5,134,389
[45] Date of Patent: Jul. 28, 1992

[54] DISPLAY TERMINAL DEVICE

[75] Inventors: Minoru Furuta, Fujisawa; Manabu Furuya, Chigasaki, both of Japan

[73] Assignee: International Business Machines Corporation, Armonk, N.Y.

[21] Appl. No.: 473,490

[22] Filed: Feb. 1, 1990

[30] Foreign Application Priority Data

Feb. 1, 1989 [JP] Japan .................................... 1-20873

[51] Int. Cl.$^5$ ............................................. G09G 5/12
[52] U.S. Cl. ................................... 340/707; 340/708
[58] Field of Search .............................. 340/707, 708

[56] References Cited

U.S. PATENT DOCUMENTS 3,832,693  8/1974  Ishizaki et al. ..................... 340/707
4,146,880  3/1979  Arizabalaga ........................ 340/707

OTHER PUBLICATIONS

Patent Abstract of Japan, vol. 5, No. 169, (P-086), Oct. 28, 1981; & JP-A-56 096 320 (Fujitsu Ltd.) Apr. 8, 1981; entitled "Light Pen Detecting System", by Noda Katsunobu.

*Primary Examiner*—Jeffery A. Brier
*Attorney, Agent, or Firm*—Robert M. Trepp

[57] ABSTRACT

A display terminal and apparatus for detecting the position of a light pen detecting field on a display surface at times the light pen is pointed to the light pen detecting field is described incorporating a column counter, scanning line counter, character row counter, light pen detecting field counter, and a light pen detecting line counter interconnected with an address generator, decoder, character code buffer, attribute buffer, font memory, light pen detection line generator mask line generator and scanning type display device. The invention overcomes the problem of misjudging the column address arising from variable delay times of the sensor signal from a light pen pointed to and sensing light from a display surface.

16 Claims, 6 Drawing Sheets

DISPLAY TERMINAL DEVICE

BACKGROUND OF THE INVENTION

1. Field of the Invention

This invention relates to a display terminal which displays character images on a display screen or surface by scanning the display surface and detects the position of a light pen detecting field on the display surface, which is pointed to and sensed by a light pen.

2. Description of the Prior Art

The light pen has been used to have an operator point to a particular light pen detecting line which may be overlappingly displayed with a character dot pattern displayed on a display surface or screen of a display device of a raster scan type, such as cathode ray tube display device. Referring to FIGS. 7A and 7B showing one example of the prior technology, a first light pen detecting line shown by double circles is displayed in character columns N-1 and N in a light pen detecting field K, and a second light pen detecting line is displayed in character columns N+2, N+3, N+4, ... in a light pen detecting field K+1. The intensity of the light pen detecting lines is high intensity so that a light sensor of the light pen generates a large sense pulse. When the operator wants to process a group of the characters in the light pen detecting field K, the operator positions the light pen on the light pen detecting line of the field K. It is assumed that the light pen is positioned at dot 70. The light sensor of the light pen generates a sense pulse 71 at To. During the display of the detecting line of the field K, a control device knows the column address, i.e. character addresses N-X ..., N-1, N included in the detecting field K. The sense pulse 71A represents the sense pulse reaching or arriving at the control device after a minimum transmission delay time T1. The control device, receives the sense pulse 71A and judges the column address selected by the light pen from N-X, ..., N-1, and N. However, an unexpected additional delay time T2 could be generated, whereby the sense pulse 71 arrives at the control device after a long delay time T3 as shown by a pulse 71B. By the way, when the light pen is positioned on a dot 72 in the detecting line in the detecting field K+1, the sense pulse 73 is generated. It is assumed that pulse 73 arrives at the control device after a delay time T4. Therefore, there are two cases when the sense pulse arrives at the control device at time T5. One is when the sense pulse 71B from the detecting field K arrives and the other is when the sense pulse 73A from the detecting field K+1 arrives. Thus when the light pen is positioned at the dot 70 in detecting field K, the control device may misjudge the sense pulse 71B as the sense pulse 73A from detecting field K+1.

The prior technology solves the above misjudgment problem by measuring the expected maximum delay time of the sense pulse 71, as shown in FIG. 7B, and placing the additional space codes in columns N+2 and N+3, which fall into the maximum delay time. This approach, however, requires an additional two spaces, which do not display the character images, so that this approach reduces the number of the display character images on the display surface, and displays unnaturally long spaces in columns N+1, N+2 and N+3.

Japanese patent application 60-136526 discloses a method for compensating the transmission delay time to detect the actual position of the light pen in the detecting field. Before use of the display terminal, a reference dot at a known address on the display surface is detected by the light pen. An address represented by the detected signal from the light pen is compared with the known address. A value representing a difference between the known address and the detected address is stored in a memory. The value is used to compensate the detected address. The method solves the problem caused by a fixed transmission delay time of the detected signal. But, the transmission delay time could be variable due to variation of circuit parameters caused by operating temperature, a change of brightness of the cathode ray tube by the operator, voltage deviation of a power supply, etc.. The method disclosed in Japanese patent application 60-136526 cannot compensate for the variable transmission delay times.

SUMMARY OF THE INVENTION

A display terminal device displays character images on a display surface by scanning the display surface and detects or indicates the position of a light pen detecting field on the display surface which is pointed to and sensed by the light pen. The display terminal device, in accordance with the present invention, comprises means for specifying positions of plural light pen detecting fields on the display surface, and means for displaying a light pen detecting line in each of the light pen detecting fields. The light pen detecting line in one light pen detecting field is displayed on one scan line, and the light pen detecting line to the one light pen detecting line in the next light pen detecting field to the one light pen detecting field is displayed on a scan line behind or another scan line. The display terminal device further comprises means for inhibiting the display of the character dots of the next light pen detecting field on the one scan line during a period which is longer than the maximum transmission delay period of the sense signal of the light pen. The above means for specifying positions of plural light pen detecting fields comprises a decoder for responding to a detecting line attribute code for a character to be displayed, to generate signals representing the light pen detecting field. The detecting line attribute code requires the display of the light pen detecting line on the character dot pattern.

The above stated means for displaying a light pen detecting line in each of the light pen detecting fields comprises, first means for generating first count value representing that the one scan line is being processed and second count value representing that the scan line behind or another scan line is being processed, second means for responding to the signals from the decoder to generate a first count value representing the one light pen detecting field and a second count value representing the next light pen detecting field, and third means for responding to the first and second count values of the first means and the first and second count values of the second means to display the light pen detecting line in the one light pen detecting field on the one scan line and the light pen detecting line in the next light pen detecting field on the scan line behind or another scan line.

DESCRIPTION OF THE PREFERRED EMBODIMENTS

Figure 1:
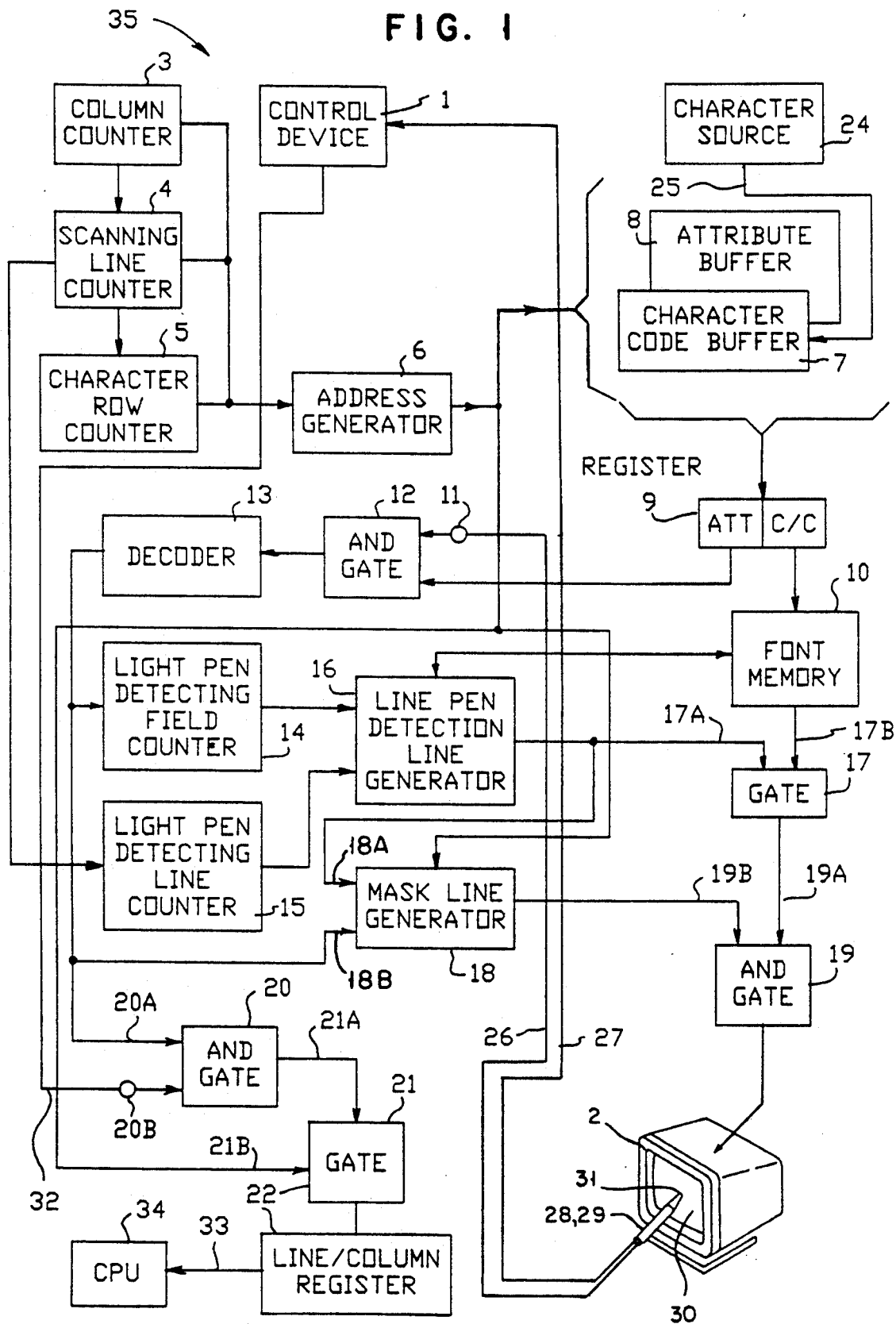
FIG. 1 shows the circuit block diagram of the display terminal apparatus in accordance with the present invention.

FIG. 1 shows a circuit block diagram of a display terminal device 35 in accordance with the present invention. A control device 1, such as a microprocessor, controls the operations of the blocks in the FIG. 1. Actually, a large number of control lines for controlling the operations of the blocks are connected between the control device 1 and the blocks. For simplifying the drawing however, the control lines are not shown.

Figure 2:
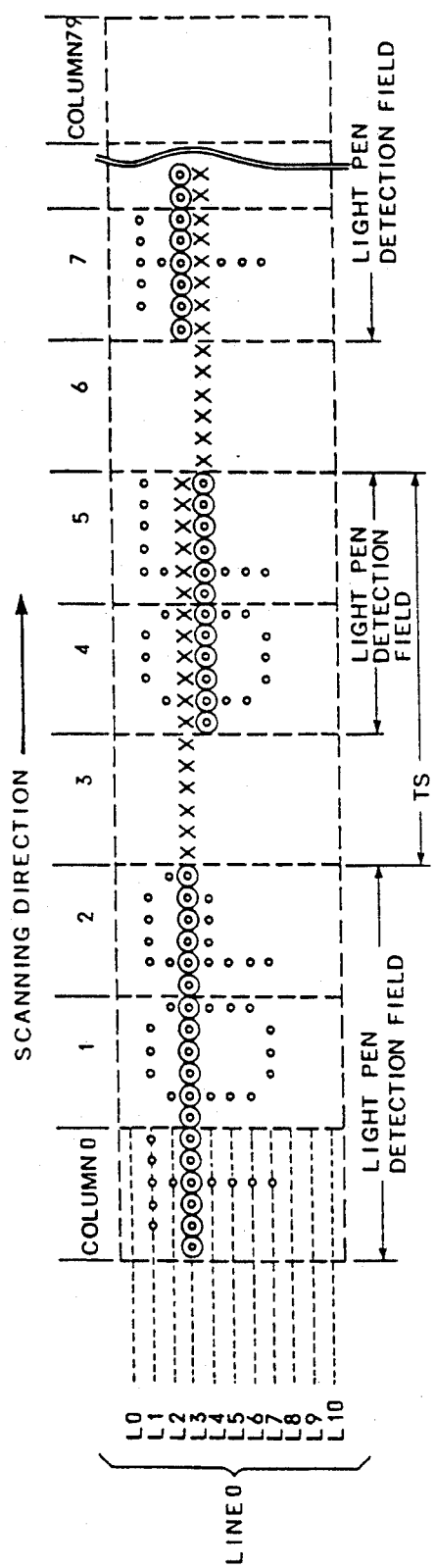
FIG. 2 is a graph of the light pen detecting lines and the masked dots on the display surface.

A display surface or screen of a display device 2 is divided into plural character boxes, such as 80 (horizontal)×32 (vertical). That is, the 32 character rows each of which includes the 80 character boxes or columns, are displayed. Referring to FIG. 2, one character row is shown. Each character box shown by dashed line includes 6×11 dots or picture elements, and one character represented by 5×7 dots is displayed in the character box. The position of the character boxes in the horizontal direction are represented by columns. For example, the column 0 represents the first character box, and the column 79 represents the 80th character box. One row includes eleven scan lines. In the embodiment, the scan lines are traced in accordance with a raster scan scheme. It is noted that the dashed lines defining the character boxes are not actually displayed on the display surface. And, it is assumed that the row shown in the FIG. 2 is the first character row, and that the characters "TOP OF THE ... " are displayed on first group of columns 0, 1 and 2, second group of columns 4 and 5, and third group of columns 7, 8 . . . , as shown in the FIG. 2.

In the embodiment in accordance with the invention, light pen detecting line shown by double circle in the first group of columns 0, 1 and 2 is displayed on one scan line, such as the scan line L3, the light pen detecting line in the second group of columns 4 and 5 is displayed on the scan line behind, such as scan line L4, the light pen detecting line in the third group of columns 7, 8, . . . is displayed on the scan line L3 and so on. One group of columns represents one word of the text document. In other words, the light pen detecting lines in odd words, i.e. odd fields are displayed on the scan line L3, and the light pen detecting lines in even words, i.e. even fields, are displayed on the next scan line L4. The light pen detecting line is displayed in the field. The field is called a light pen detecting field in the specification.

Describing the operations with reference to the FIG. 1, it is assumed that the display operations are started at column 0 of the first row 0. The control device 1 writes the code of the characters from character source 24 on lead 25, which are displayed on the display screen, into a character code buffer 7, and writes detecting line attribute codes of the characters into an attribute buffer 8. The detecting line attribute for each character code indicated that the light pen detecting line should be displayed on the character. Although many attributes, such as color, blink, reverse attributes, etc. other than the detecting line attribute are actually used, only the detecting line attribute is described.

At the start of the display operations, the control device 1 resets a column counter 3, a line counter 4 and a row counter 5. The column counter 3 counts the number of columns, and is reset when it reaches the count value 79. The line counter 4 counts the number of scan lines L0, L1, L2, . . . , and is incremented when the column counter 3 reaches to the count value 79, and is reset to the value 0 when it reaches the value 10. The row counter 5 counts the number of character rows, and is incremented when the line counter 4 reaches the value 10, and is reset when it reaches the value 31.

The values of the column counter 3, the line counter 4 and the row counter 5 are supplied to an address generator 6. The address generator 6 controls the access to the character code buffer 7, the attribute buffer 8 and a font memory 10, which stores dot images or dot patterns of the characters to be displayed on the display screen of the display device 2, so that, as the scan operations proceed along the scan lines L0, L1, L2, . . . , the dot patterns of the characters are displayed in the character boxes. Since these operations are well known in the art, the details of the operations are not described.

Describing the light pen 28, it includes a light pen switch 29 which generates ON signal on lead 26 when the operator presses the light pen 28 onto the display surface 30, and a photosensor 31 which senses the light of the displayed image to generate a sense signal on lead 27. The ON signal is applied to AND gate 11 shown in FIG. 1, and is maintained after the operator removes the light pen from the display surface.

Figure 3:
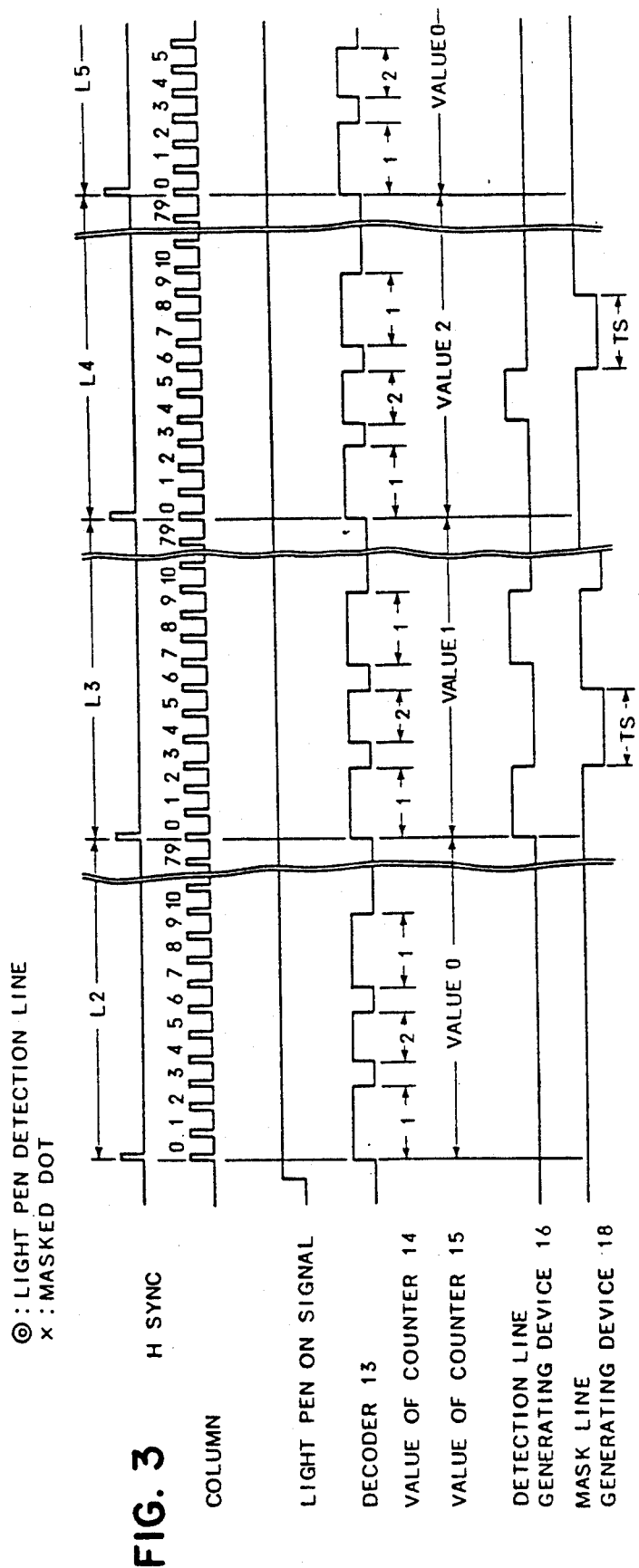
FIG. 3 shows the various waveforms in the circuit blocks in the FIG. 1.

Referring to FIG. 3, the pulse waveforms show the operations, in accordance with the present invention, performed during the scan operations of the scan lines L2, L3, L4 and L5 shown in the FIG. 2. Horizontal synchronous pulses H SYNC are generated to start the line scan operations. COLUMN indicates the positions of the character boxes in the row. Referring to the FIG. 1 again, a register 9 stores a character code c/c and its detecting line attribute code ATT. Each of the characters "TOP OF THE" has the detecting line attribute. It is assumed that the light pen ON signal has already been generated and maintained by a known latch, as shown in FIG. 3. The light pen ON signal is applied to an input terminal 11 of AND gate 12. Therefore, the AND gate 12 supplies the detecting line attribute codes, if any, of the character columns 0-79 of one row to a decoder 13 which generates a low level signal in response to the absence of the detecting line attribute code in the respective character columns, and generates a high level signal in response to the presence of the detecting line attribute code in the respective character columns, as shown in the FIG. 3. The up level of the output of the decoder 13 represents the light pen detecting field. The first light pen detecting field includes the columns 0, 1 and 2, the second field includes the columns 4 and 5, and the third field includes the columns 7, 8 and 9.

A light pen detecting field counter 14 repeatedly generates the count values 1, 2, 1, 2, . . . when it detects leading and falling edges of the output signal of the decoder 13, as shown in the FIG. 3.

A light pen detecting line counter 15 receives the line counts representing the scan lines L0, L1, . . . L10 shown in FIG. 2, generates the count value 0 during the scan line L0, L1, L2, L5, L6, L7, L8, L9 and L10, and generates the count value 1 during the scan line L3 and generates the count value 2 during the scan line L4, as shown in the FIG. 3.

The output lines of both the counters 14 and 15 are connected to a light pen detection line generator 16, as shown in the FIG. 1. The generator 16 compares both the count values of the counters 14 and 15. When both the count values are equal, as in the cases of the first light pen detecting field including the columns 0,1 and 2 in the scan line L3, the third light pen detecting field including the columns 7, 8 and 9 in the scan line L3, and the second light pen detecting field including the columns 4 and 5 in the scan line L4, the light pen detecting line generator 16 generates high intensity signals for the dots in the fields in synchronism with the generation of the dot pattern by the font memory 10. The high intensity signals represent the light pen detecting lines of the high intensity or brightness which are shown by the double circles in FIG. 2. The high intensity or brightness signals are supplied to one input 17A of a gate 17. The other input 17B of the gate 17 is connected to the font memory 10. When the high intensity signals for the dots are not supplied to the input 17A, the gate 17 passes the dot pattern from the font memory 10 to an input 19A of AND gate 19. When the high intensity signals for the dots are supplied to the input 17A, the gate 17 passes the high intensity signals to the input 19A of the AND gate 19. When a signal level of an input 19B of the AND gate 19 is UP level, the light pen detecting lines of high intensity as shown by the double circles in the FIG. 2 are displayed in the light pen detecting fields. The display device 2 includes the CRT and display logic circuit, which receives the output of the AND gate 19 to control the display on the CRT. The logic circuit is well known in the art, and is not described.

A mask line generator 18 has an input 18A connected to the line 17A of the light pen detecting line generator 16 and an input 18B connected to the output of the decoder 13. The mask line generator 18 receives the address signal from the address generator 6 and generates a down level signal, which is synchronized with the dot pattern, in response to the falling edge of the output of the decoder 13 and the falling edge of the high intensity signal of the detecting line generator 16, as shown in FIG. 3. The mask line generator 18 will stop the generation of the down level signal after the suppression period TS which is longer than the maximum transmission delay time shown in FIG. 7. In the embodiment, the suppression period TS is selected to be equal to the period of three columns, for simplifying the description. The down level signal is applied to the input 19B of the AND gate 19 to suppress the passage of the dot signals from the gate 17, whereby any dot signal is not supplied to the display device 2, resulting that the dots in the columns 4 and 5 on the scan line L3 and the dots of the character columns 7 and 8 on the scan lines L4 are not displayed.

Thus, on scan line L3, the light pen detection lines are displayed in the first light pen detecting field i.e. columns 0, 1 and 2 and the third light pen detecting field, i. e. columns 7, 8 and 9 while the dots in the second light pen detecting field, i.e. columns 3, 4 and 5 are not displayed. And, on the scan line L4, the light pen detecting line is displayed in the second light pen detecting field, i.e. columns 4 and 5, while the dots in the columns 7 and 8 in the third light pen detecting field are not displayed. The mask period TS of the non-display, masking or the suppression of the image dot is longer than the maximum transmission delay time, as shown in FIG. 7, of the sense signal.

Next, it is assumed that the operator positions light pen 28 on the first light pen detecting line. The photosensor 31 in the light pen senses the light of the light pen detecting line to generate the sense signal. The sense signal is transmitted over lead 27 to the control device 1 with a transmission delay smaller than the period TS. The control device 1 recognizes the received sense signal to supply the pulse over lead 32 to an input 20B of AND gate 20. The output signal of the decoder 13 is supplied to input 20A of the AND gate 20, and the AND gate 20 is conditioned to generate and supply the signal to an input 21A of a gate 21, which passes the row and columns addresses at input 21B, indicating the light pen detecting field from the address generator 6, to be stored in row/column register 22. The row and column addresses stored in the register 22 which is coupled over lead 33 to control processing unit 34 represent the light pen detecting field which the operator specifies. And central processing unit 34 to which the display terminal device 35 is connected is interrupted to perform further processes selected by the operator.

Figure 4:
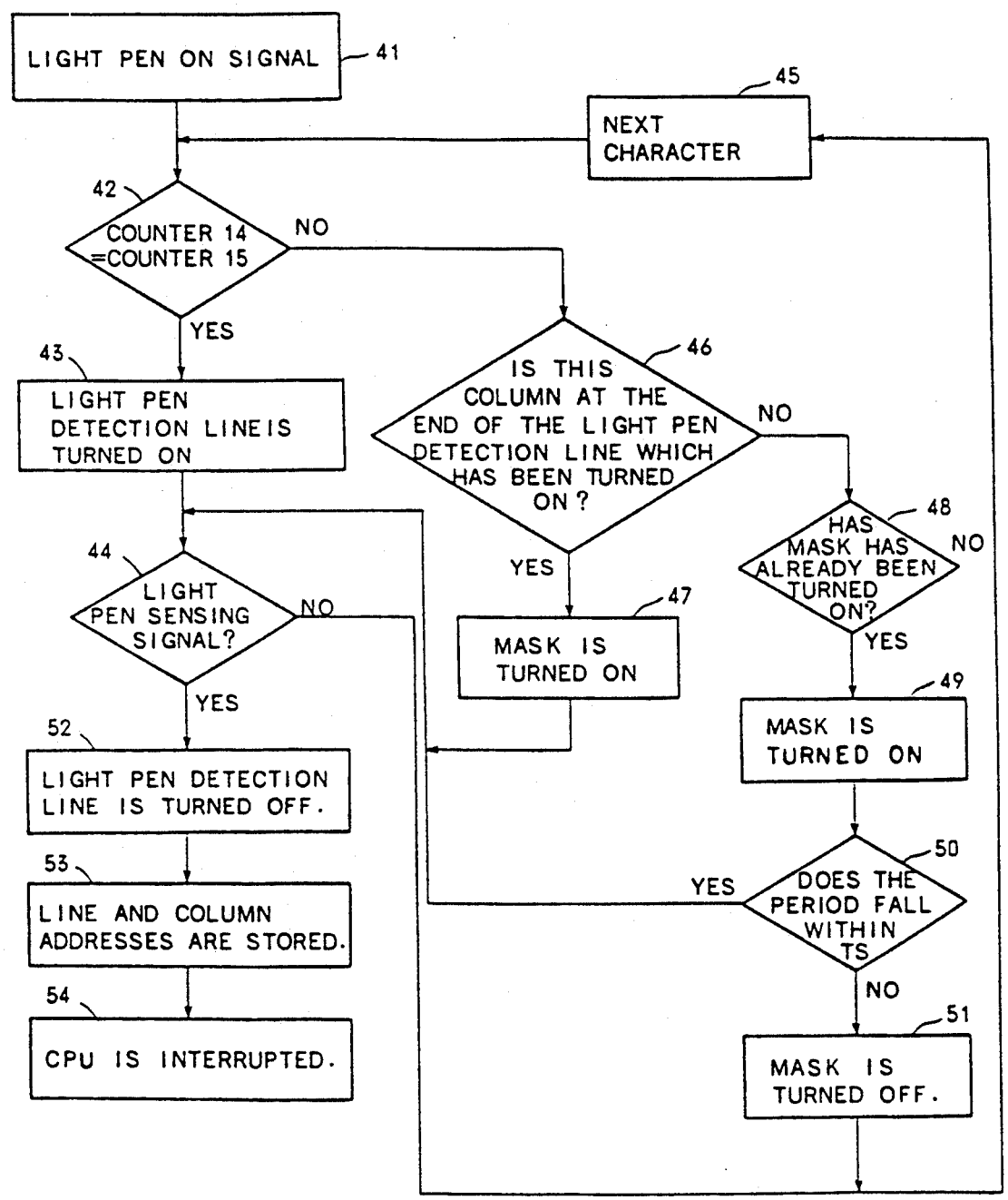
FIGS. 4, 5 and 6 show the operational flowcharts of the circuit blocks in FIG. 1.

FIG. 4 shows the operational flow of the circuits of the display terminal device 35 shown in the FIG. 1. In a block 41, the light pen ON signal is generated, as shown in the FIG. 3. The detecting line attribute code of the character "T" in the row 0, column 0 is supplied to the decoder 13. And in a clock 42, the count value of the light pen detecting field counter 14 and the count value of the light pen detecting line counter 15 are compared by the light pen detecting line generator 16. Since both the count values are equal in the exemplary case shown in the FIG. 3, the answer of the block 42 is YES and the operations proceed to a block 43, wherein the light pen detecting line is displayed in the row 0, column 0 in the FIG. 3. The operations proceed to a block 44 in which the determination as to whether the light pen generates the sense signal is made. Since the answer of the block 44 is NO in the exemplary case, the operations proceed to a block 45, and the detecting line attribute code of the next character "O" is supplied to the decoder 13, and the operations through the blocks 42, 43, 44 and 45 are performed. And, the detecting line attribute code of the next character "P" is supplied to the decoder 13 and the same operational loop as the characters "T" and "O" is traced. At this stage, the light pen detecting line on the scan line L3 is displayed in the column 0, 1 and 2. The next code is a space code without the detecting line attribute code, so that the answer of the block 42 is NO, and the operations proceed to a block 46 wherein a determination as to whether the column is adjacent to the end of the displayed light pen detecting line is made. Since the space in column 3 and it is adjacent to the end of the light pen detecting line, the answer of block 46 is YES, and the operation proceeds to block 47 in which the mask operations on scan line L3 in column 3 is performed. And the operation proceeds to block 44, and in the example, the answer is still NO. And, in block 45, the detecting line attribute code of the next character "O" is supplied to decoder 13. Since the count value of counter 14 and the count value of counter 15 are not equal in column 4, as shown in the L3 period in FIG. 3, the answer of the block 42 is NO. In block 46, since column 4 is not adjacent to the end of the light pen detecting line already displayed, the answer of the block 46 is NO. The operation proceeds to block 48 wherein the determination as to whether the mask operation has been performed in the previous column is made. Since the mask operation in the previous column 3 has been performed the answer of block 48 is YES. In the next block 49, the mask operation on scan line L3 in column 4 is performed. The operation proceeds to a block 50 wherein the determination as to whether the mask period TS has been terminated or not is made. The answer of block 50 is YES in this example, and in block 44, the generation of the light pen sense signal is determined. In this example, the answer is NO. And, in block 45, the detecting line attribute code of the next character "F" is supplied to the decoder 13, and the operation proceeds to block 42. In this example, the answer of block 42 is NO since the count value of counter 14 is "2" and the count value of counter 15 is "1", as shown in column 5 in period L3 of FIG. 3. The operation proceeds to block 46. In this example, the answer of block 46 is NO. The operation proceeds to block 48. The answer of block 48 is YES in this example. Then, in block 49, the scan line L3 of column 5 is masked, as shown in FIG. 2. The operation proceeds to block 50. The answer of block 50 is YES, since column 5 is positioned within masking period TS. The operation proceeds to block 44. In this example, the light pen sense signal has not been generated yet, the answer of block 44 is NO. And, the operation returns to block 45, wherein the next space code without the detecting line attribute code is supplied to the decoder 13. During the space in column 6, the count value of the counter 14 is not generated, therefore, the answer of block 42 is NO. The operation proceeds to block 46. The answer of block 46 is NO in this example. The next block 48 determines whether the mask operation has been performed in the previous column. The answer of block 48 is YES in this example, and the operation proceeds to block 49 and the mask operation in column 6 on the scan line L3 is made. The operation proceeds to block 50 which determines whether the current column is positioned within the masking period TS. In this example, the current column is column 6 and the masking period TS has already been terminate, as shown in FIG. 2. The answer of block 50 is NO. The operation proceeds to block 51, which turns off the mask operation in column 6 on scan line L3 in this example; resulting that the mask operation is not made in column 6 on scan line L3, as shown in FIG. 2. In this manner, the operations are performed, which displays the light pen detecting lines, and masks the dots of the succeeding columns falling into the suppression period TS in the same scan line as the scan line on which the light pen detecting line is displayed. And, the operations are repeated to continuously display the light pen detecting lines. When the operator positions the light pen onto the light pen detecting line, the light pen generates the sense signal. During the display operations of the scan line L3, the control device 1 determines as to whether the light pen sense signal is generated in the odd light pen detecting field. And, during the display operation of scan line L4, control device 1 determines whether the light pen sense signal is generated in the even light pen detecting field. The generation of sense signal is sensed in block 44, and block 44 generates the answer YES. The operation proceeds to a block 52, the addresses of the light pen detecting field are stored in the row and column register 22 shown in FIG. 1. And, in block 54, the interrupt to CPU 34 is made.

For example, the operator wants to copy the character "TOP" shown in FIG. 2, the operator positions the light pen onto the light pen detecting line displayed in row 0, column 0, 1 and 2, shown in FIG. 2. and, the row address 0 and the column addresses 0, 1 or 2 are stored in the row and column register 22 as the address of the light pen detecting field. The characters "TOP" are copied at the position specified by the operator. Since the copy operations are well known in the art, the operations are not described in the specification.

Figure 5:
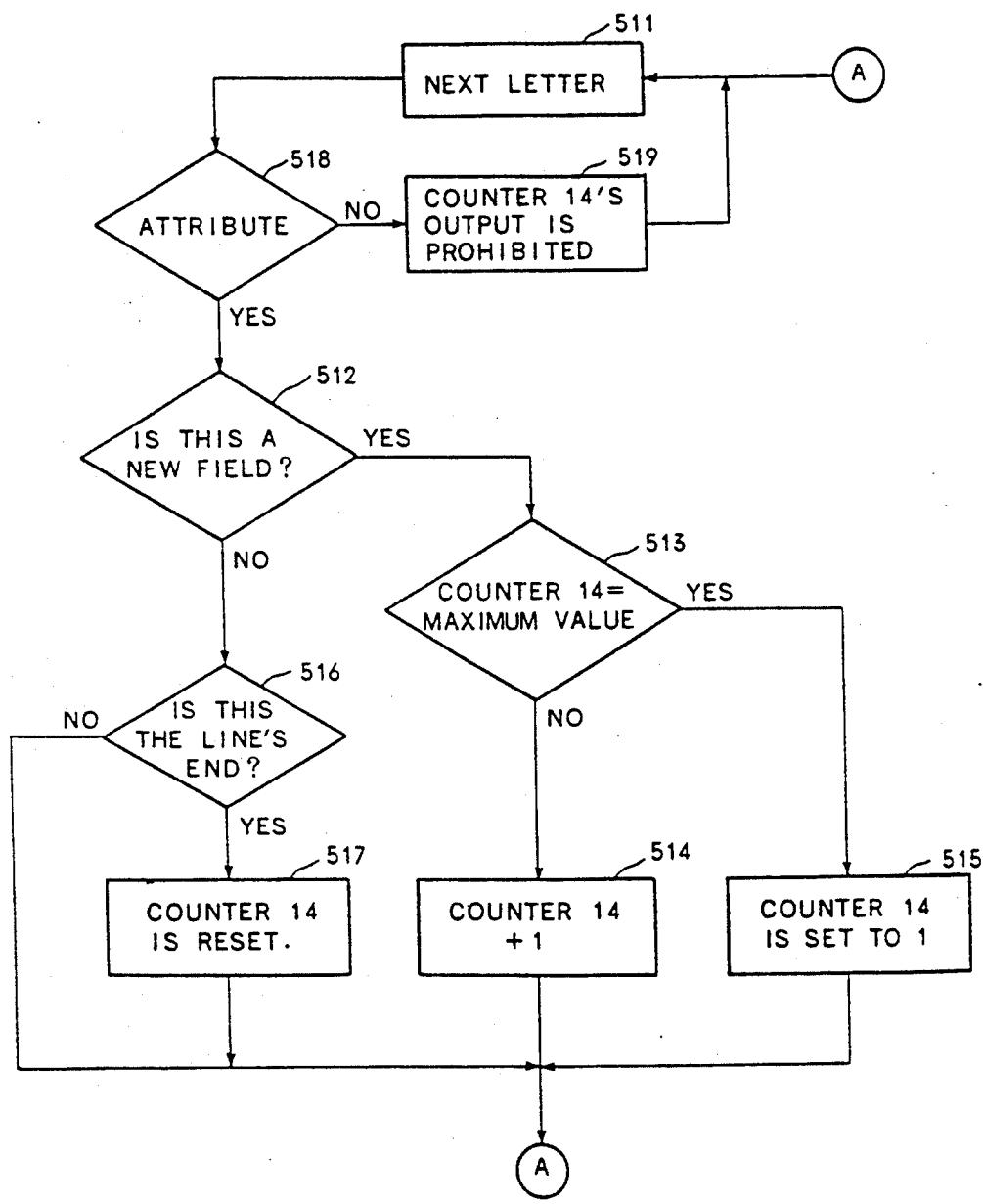

FIG. 5 shows the operational flow of the light pen detecting field counter 14 shown in FIG. 1. Before the start of the line scan, counter 14 is reset by the control device 1. Since counter 14 repeats the same operations during the line scan operations of scan lines L0-L10, the operations during the L3 period shown in FIG. 3 for scanning scan line L3 are described.

In block 511 shown in FIG. 5, the detecting line attribute code of the first character "T" is decoded by the decoder 13. The operations proceed to block 518 which determines as to whether the detecting line attribute code exists. The answer of the block 518 is YES in this example. Next, a block 512 determines as to whether it is the beginning of the light pen detecting field. In this exemplary case, the answer of the block 512 is YES, and the operations proceed to block 513, which determines as to whether the count value of the counter 14, "0" in this exemplary case. The answer of the block 513 is NO, and the operations proceed to a block 514 wherein the count value 0 is incremented to the value 1. The operations proceed to the block 511 to supply the attribute code of the next character "O" to the decoder 13. The answer of the block 518 is YES, and the answer of the block 512 is NO, and the operations proceed to a block 516 which determines as to whether the end of the scan line has been reached. The answer of the block 516 is NO and the operation returns to the block 511. For the next character "P", the loop including the blocks 518, 512, 516 and 511 is traced. Thus, during the characters "TOP" in the first light pen detecting line, the count value of the light pen detecting field counter 14 is the value 1. The next code is the space code without the detecting line attribute code. And, the answer of the block 518 is NO, and the operations proceed to the block 519, thus the count value 1 is suppressed during the space code of the column 3, and shown in the FIG. 3. And, the operations returns to the block 511 which supplies the detecting line attribute code of the character "O" to the block 512 which finds out the beginning of the second on new field. Then, the answer of the block 512 is YES. The next block 513 find out the current count value 1 of the counter 14 is not equal to the maximum value 2, then the block 514 increments the current count value 1 to the value 2. For the next character "F", the loop including the blocks 511, 518, 512, 516 and 511 is traced. For the next space code in the column 6, the loop including the blocks 511, 518, 519, and 511 is traced, so that the count value 2 is suppressed during the column 6. The next character is "T" and its detecting line attribute code is sensed in the block 518 and the operations proceed to the block 512. Since the field starting at character "T" is the new field, the answer of block 512 is YES and the count value 2 for the previous columns 4 and 5 is compared with the maximum value 2, so that the answer of the block 513 is YES, and the count value is set to the value 1 in a block 515, as shown in the column 7 in the FIG. 3. When the end of the scan line is detected in the block 516, the counter 14 is reset in a block 517.

Figure 6:
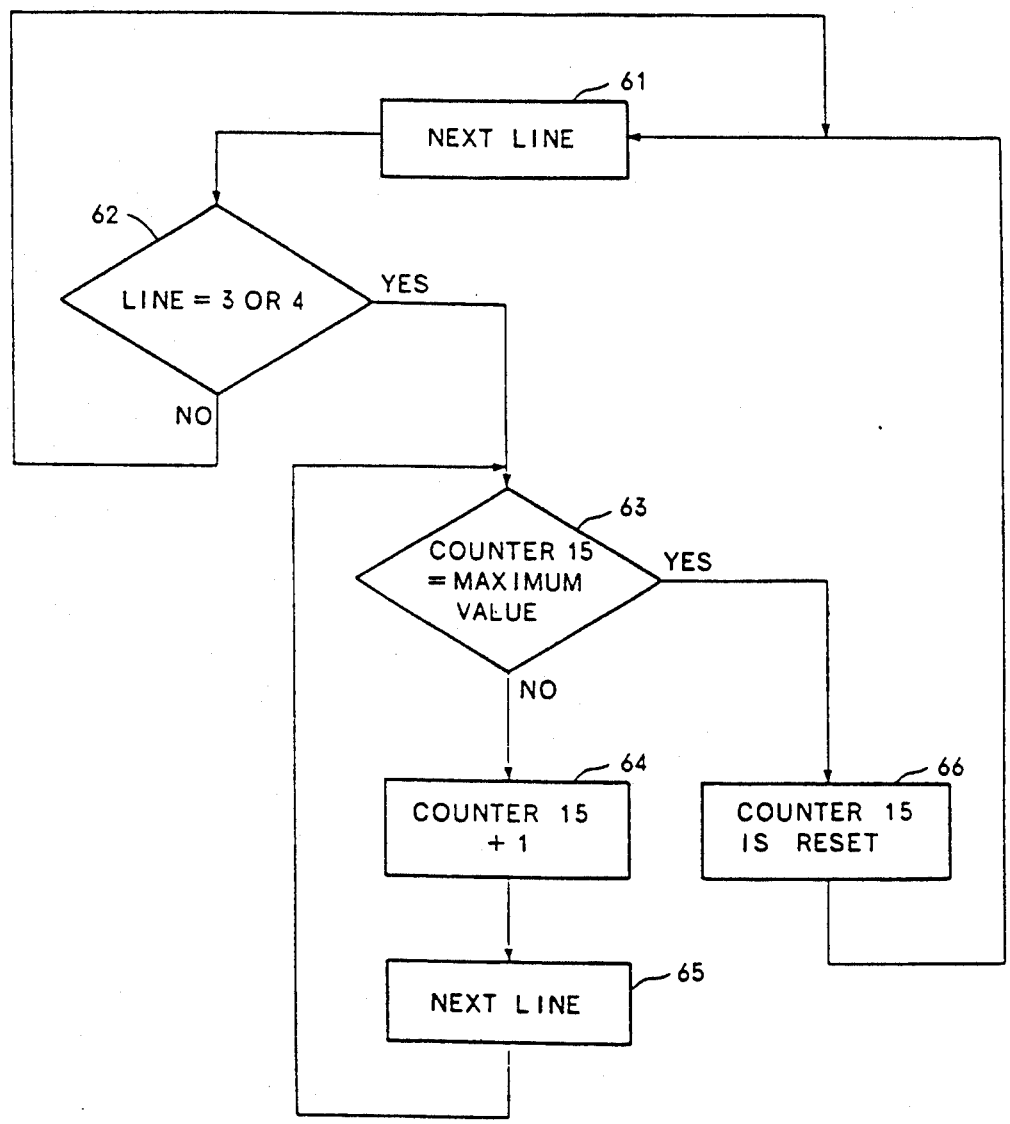

FIG. 6 shows the operational flow of the light pen detecting line counter 15 shown in the FIG. 1. Before the start of the line scan of the scan line L0, the counter 15 is reset by the control device 1. The line count value representing scan line L0–L10 is supplied from the line counter 4 to the light pen detecting line counter 15, as shown in the FIG. 1. Whenever the line count value is supplied in a block 61, the line count value is compared with the value 3 or 4, which represents the scan line L3 or L4 in a block 62. When the display operations on the scan line L3 is performed, the answer of the block 62 is YES and the operations proceed to a block 63. The block 63 determines as to whether the count value of the light pen detecting line counter 15 is equal to the maximum value, the value 2 in the exemplary embodiment. The answer of the block 63 is No. Then, in block 64, the count value 0 of the counter 15 is incremented to the value 1, as shown in the period L3 of the FIG. 3. And, the next line count value L4 is supplied from the line counter 4. The answer of the block 62 is YES. Since the current count value 1 of the counter 15 is not equal to the maximum value 2, the answer of the block 63 is NO. And, the count value 1 of the counter 15 is incremented to the value 2 in the block 64, as shown in the period L4 of the FIG. 3. In the block 65, the next count value L5 is supplied from the line counter 4 to the counter 15. Now, the answer of the block 63 is YES, and the operations proceed to a block 66 which resets the count value 2 of the counter 15 to the value 0. In this manner, the light pen detecting line counter 15 generates the count value 1 during the scan line L3 and the count value 2 during the scan line L4, as shown in the FIG. 3.

In the above described embodiment, the light pen detecting lines are displayed on the scan lines L3 and L4. However, the embodiment is easily modified to display first light pen detecting line on the scan line L3, during the first light pen detecting field, i.e. columns 0, 1 and 2, second light pen detecting line on the scan line L4 during the second light pen detecting field i.e. columns 4 and 5, and third light pen detecting line on the scan line L5 during the third light pen detecting field, i.e. columns 7, 8 and 9. The modification is made by changing the maximum values in the blocks 513 in the FIG. 5 and the block 63 in FIG. 6 from value 2 to the value 3. In the embodiment, although the CRT type display device 2 is used, other display devices, such as a liquid crystal display device, a plasma display device, an electroluminescense display device, etc. of the raster scan type can be used.

Figure 7A:
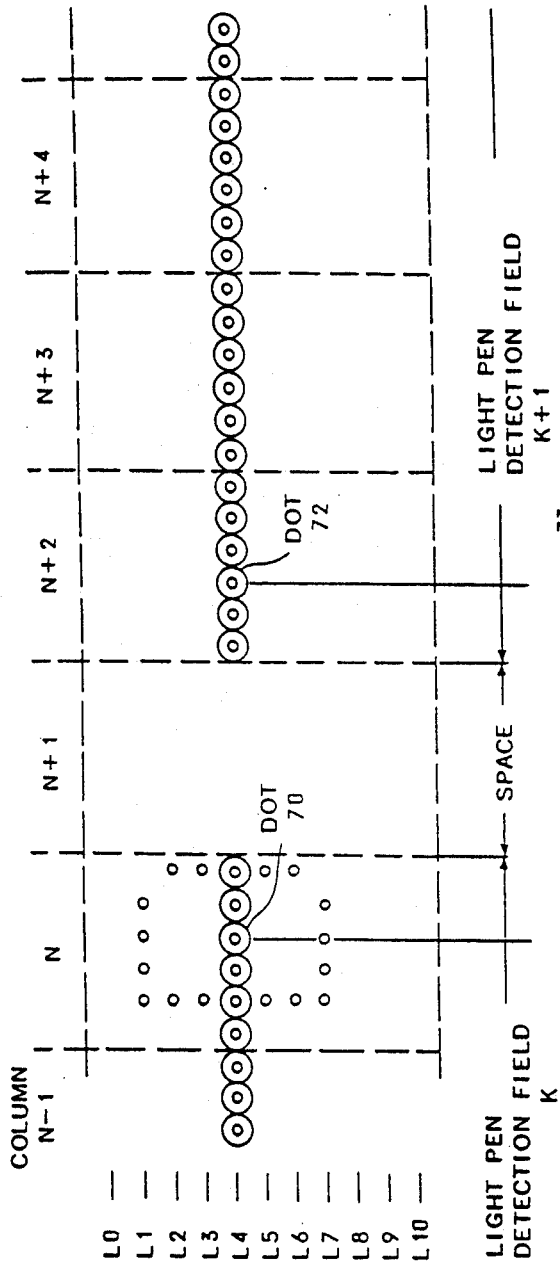
FIG. 7A is a graph of the light pen detecting line on a display surface of the prior art.
Figure 7B:
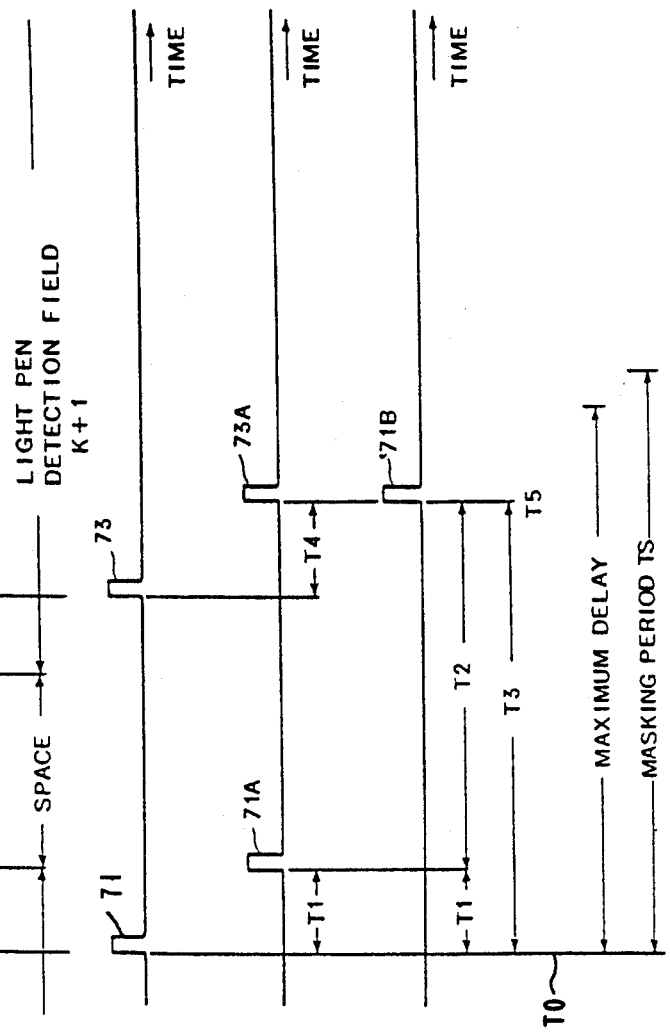
FIG. 7B shows a graph of timing problems in the prior display terminal device.

The invention solves the problem in the prior technology described hereinbefore with reference to FIGS. 7A and 7B. In accordance with the present invention, the need of providing the unnatural long space in the columns N+1, N+2 and N+3 in FIG. 7A required by the prior technology is completely eliminated. In the present invention, only one column space, such as the space in column 3 and the space in column 6 between the characters is required; resulting that the number of characters displayed on the display surface are remarkably increased without the described problems of misjudging the column addresses of sense pulse by the control device.

We claim:

1. An apparatus for displaying images on a display surface by scanning said display surface and for detecting the position of a selected light pen detecting field on said display surface at all times the light pen pointed to the light pen detecting field comprising:
   means for specifying positions of plural light pen detecting fields on said display surface, some of said light pen detecting fields positioned adjacent one another in the direction of scanning, each said light pen detecting field having a respective length in said scanning direction and a respective height transverse to said scanning direction, said height including a plurality of scan lines, and
   means for displaying a light pen detecting line in each of said light pen detecting fields, said light pen detecting line in one light pen detecting field being displayed on one scan line, and said light pen detecting line in the next light pen detecting field in the direction of scanning being displayed on another scan line whereby the sense signal generated by said light pen from each of two adjacent light pen detecting fields in the direction of scanning are separated by the time required to scan said another scan line after scanning said one scan line.

2. The apparatus according to claim 1, wherein said image is a dot pattern of a character in said light pen detecting field and said light pen detecting line includes respective dots of said character falling along one scan lien of said plurality of scan liens required to display said character.

3. The apparatus according to claim 1, further including means for inhibiting the display of said image within said next light pen detecting field on said one scan line during a predetermined time period.

4. The apparatus according to claim 3, wherein said predetermined time period is longer than an expected maximum transmission delay period of a sense signal generated by said light pen.

5. The apparatus according to claim 1, wherein said means for specifying positions of plural light pen detecting fields includes a decoder for responding to an attribute code for each character code, which requires the display of said light pen detecting line on said character to generate a signal representing said light pen detecting field.

6. The apparatus according to claim 5, wherein said means for displaying a light pen detecting line in each of said light pen detecting fields includes:
   first means for generating a first count value representing that said one scan line is being processed and a second count value representing that said another scan line is being processed;
   second means for responding to said signals of said decoder to generate a first count value representing said one light pen detecting field and a second count value representing said next light pen detecting field; and
   third means for responding to said first and second count values of said first means and said first and second count values of said second means to display said light pen detecting line in said one light pen detecting field on said one scan line and to display said light pen detecting line in said next light pen detecting field on said another scan line.

7. The apparatus according to claim 6, further including means for inhibiting the display of said image within said next light pen detecting field on said one scan line during a predetermined time period.

8. The apparatus according to claim 7, wherein said predetermined time period is longer than an expected maximum transmission delay period of a sense signal generated by said light pen.

9. A method for detecting the position of a light pen detecting field on a display surface at times the light pen is pointed to the light pen detecting field, said display surface including apparatus for displaying images on the display surface by scanning the display surface, comprising the steps of:

specifying positions of plural light pen detecting fields on said display surface, some of said light pen detecting fields positioned adjacent one another in the direction of scanning, each said light pen detecting field having a respective length in said scanning direction and a respective height transverse to said scanning direction, said height including a plurality of scan lines, and displaying a light pen detecting line in each of said light pen detecting fields, said light pen detecting lien in one light pen detecting field being displayed on one scan line, and said light pen detecting line in the next light pen detecting field in the direction of scanning being displayed on another scan line whereby the sense signal generated by said light pen from each of two adjacent light pen detecting fields in the direction of scanning are separated by the time required to scan said another scan line after scanning said one scan line.

10. The method of claim 9, further including the step of displaying an image of a character in said light pen detecting field with a plurality of dots and wherein said steps of displaying a light pen detecting line includes the step of combining respective dots of said image of a respective character falling along one scan line with said light pen detecting line and wherein a plurality of scan lines are required to display said image of said character.

11. The method of claim 9, further including the step of inhibiting the display of said image within said next light pen detecting field on said one scan line during a predetermined time period.

12. The method of claim 11, further including the step of selecting a predetermined time period longer than an expected maximum transmission delay period of a sense signal generated by said light pen.

13. The method of claim 9, wherein said step of specifying positions of plural light pen detecting fields includes the steps of decoding the attribute code for each character code being displayed, and generating a signal representing said light pen detecting field on the character being displayed.

14. The method according to claim 13, wherein said step for displaying a light pen detecting line in each of said light pen detecting fields includes the steps of first generating a first count value representing that said one scan line is being processed and a second count value representing that said another scan line is being processed;

second responding to said signals of attribute code and character code to generate a first count value representing said one light pen detecting field and a second count value representing said next light pen detecting field; and third responding to said first and second count values of said step of first generating and said first and second count values of said step of second responding to display said light pen detecting line in said one light pen detecting field on said one scan line and to display said light pen detecting line in said next light pen detecting field in said another scan line.

15. The method of claim 14, further including the step of inhibiting a display of said image within said next light pen detecting field on said one scan line during a predetermined time period.

16. The method according to claim 15, further including the step of selecting a predetermined time period longer than an expected maximum transmission delay period of a sense signal generated by said light pen.

* * * * *